US010903535B2

(12) United States Patent
Melack et al.

(10) Patent No.: US 10,903,535 B2
(45) Date of Patent: Jan. 26, 2021

(54) AIRCRAFT HYBRID COOLING SYSTEM

(71) Applicant: Wisk Aero LLC, Mountain View, CA (US)

(72) Inventors: John Melack, Redwood City, CA (US); Thomas P. Muniz, Sunnyvale, CA (US); Eric Allison, Mountain View, CA (US)

(73) Assignee: WISK AERO LLC, Mountain View, CA (US)

(*) Notice: Subject to any disclaimer, the term of this patent is extended or adjusted under 35 U.S.C. 154(b) by 233 days.

(21) Appl. No.: 16/201,832

(22) Filed: Nov. 27, 2018

(65) Prior Publication Data
US 2019/0097282 A1 Mar. 28, 2019

Related U.S. Application Data

(63) Continuation of application No. 15/675,633, filed on Aug. 11, 2017, now Pat. No. 10,177,424.

(51) Int. Cl.
*H01M 10/625* (2014.01)
*H01M 10/613* (2014.01)
*H01M 10/63* (2014.01)
*H01M 10/6556* (2014.01)
*H01M 10/6563* (2014.01)
*H01M 10/6564* (2014.01)
(Continued)

(52) U.S. Cl.
CPC ....... *H01M 10/625* (2015.04); *H01M 10/486* (2013.01); *H01M 10/613* (2015.04); *H01M 10/63* (2015.04); *H01M 10/6556* (2015.04); *H01M 10/6563* (2015.04); *H01M 10/6564* (2015.04); *H01M 10/6567* (2015.04); *H01M 10/6568* (2015.04); *H01M 2/1077* (2013.01); *H01M 2220/20* (2013.01)

(58) Field of Classification Search
CPC .................................................. H01M 10/625
See application file for complete search history.

(56) References Cited

U.S. PATENT DOCUMENTS

| 10,177,424 | B1 | 1/2019 | Melack et al. | |
| 2015/0232191 | A1* | 8/2015 | Wetzel | B64D 33/08 244/53 R |

(Continued)

OTHER PUBLICATIONS

U.S. Appl. No. 15/675,633, "Final Office Action" dated Jun. 15, 2018, 10 pages.

(Continued)

*Primary Examiner* — Brian R Ohara
(74) *Attorney, Agent, or Firm* — Kilpatrick Townsend & Stockton LLP

(57) ABSTRACT

An aircraft hybrid cooling system is disclosed. The aircraft hybrid cooling system includes a conduit through an aircraft that is configured to allow airflow through the conduit. The aircraft hybrid cooling system additionally includes a battery assembly positioned in the conduit, configured to provide for airflow past a battery in the battery assembly in a first mode of operation and configured to provide flow of a cooling medium past the battery in a second mode of operation. In some embodiments, the battery in the battery assembly is cooled via airflow in the event the aircraft is in flight and is cooled via an applied cooling medium in the event the aircraft is grounded.

20 Claims, 14 Drawing Sheets

(51) Int. Cl.
*H01M 10/6567* (2014.01)
*H01M 10/6568* (2014.01)
*H01M 10/48* (2006.01)
*H01M 2/10* (2006.01)

(56) References Cited

U.S. PATENT DOCUMENTS

2016/0167800 A1* 6/2016 Joubert ............... H01M 10/625
  429/62
2017/0162921 A1* 6/2017 Schuhmann ........ H01M 10/658

OTHER PUBLICATIONS

U.S. Appl. No. 15/675,633, "Non-Final Office Action" dated Feb. 7, 2018, 11 pages.
U.S. Appl. No. 15/675,633, "Notice of Allowance" dated Sep. 24, 2018, 7 pages.

* cited by examiner

AIRCRAFT HYBRID COOLING SYSTEM

CROSS REFERENCE TO OTHER APPLICATIONS

This application is a continuation of co-pending U.S. patent application Ser. No. 15/675,633, entitled AIRCRAFT HYBRID COOLING SYSTEM filed Aug. 11, 2017 which is incorporated herein by reference for all purposes.

BACKGROUND OF THE INVENTION

Battery systems typically used to power electric aircraft produce heat and require cooling. In flight, a lightweight and simple cooling system may be desired due to weight constraints and safety concerns. A cooling system ideal for in-flight conditions may not be capable of ground cooling a battery system to a desired temperature within a desired time frame. A cooling system capable of cooling a battery system rapidly may require bulky cooling agents or a heavy apparatus.

BRIEF DESCRIPTION OF THE DRAWINGS

Various embodiments of the invention are disclosed in the following detailed description and the accompanying drawings.

DETAILED DESCRIPTION

Figure 1A:
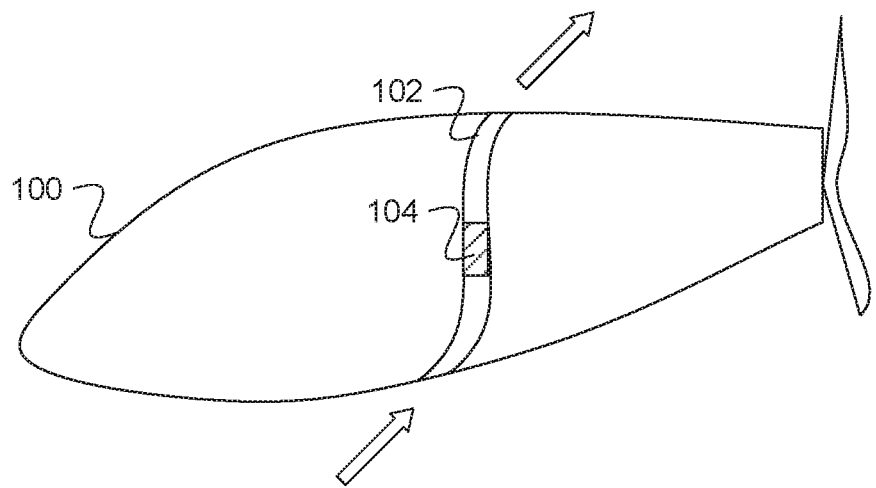
FIG. 1A is a diagram illustrating an embodiment of an aircraft hybrid cooling system.

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

An aircraft hybrid cooling system is disclosed. The hybrid cooling system comprises a conduit through an aircraft, wherein the conduit is configured to allow airflow through the conduit. The hybrid cooling system also comprises a battery assembly positioned in the conduit, configured to provide for airflow past a battery in the battery assembly in a first mode of operation and configured to provide flow of a cooling medium past the battery in a second mode of operation. In some embodiments, the first mode of operation comprises a flight mode and the second mode of operation comprises a grounded mode.

In some embodiments, the conduit comprises a continuous, unobstructed upward slope from its inlet to its outlet. The conduit may pass through an aircraft fuselage. In some embodiments, normal aircraft flight causes air to pass through an inlet of the conduit, past the battery, and out an outlet of the conduit. The airflow through the conduit cools the battery during flight. In the event the aircraft is grounded, various equipment and cooling agents may be applied to the conduit to rapidly cool the battery. The configuration of the conduit and battery may enable a cooling agent to be applied directly to the battery without coming into contact with other components of the aircraft that are not desired to be cooled (e.g. a pilot's seating area, a stowed parachute, a joystick, or any other aircraft component). In some embodiments, the cooling agent is easily applied to a battery within the aircraft and removed from the aircraft due to the configuration and position of the conduit. In various embodiments, the conduit is sealed at one end and the batteries are immersed in a cooling medium, a cooling medium is dripped or sprayed through the conduit, or a cooling medium is otherwise applied. In various embodiments, a cooling liquid, a cooling gas, or a combination of cooling mediums is used.

FIG. 1A is a diagram illustrating an embodiment of an aircraft hybrid cooling system. In the example shown, aircraft 100 comprises conduit 102. Conduit 102 may comprise a channel or pipe that traverses the aircraft. The conduit may be fully enclosed or sealed from the rest of the aircraft. In some embodiments, conduit 102 is isolated from a cockpit of the aircraft. A pilot may be protected from heat, gases, or outside air contained within the conduit. In some embodiments, fire resistant or nonflammable materials are used in building the conduit or are used around the conduit.

In some embodiments, the conduit connects two openings in the aircraft, allowing air to flow through the aircraft during flight. As shown, aircraft 100 is in flight and air flows through an inlet of the conduit at the bottom of the aircraft and exits an outlet of the conduit atop the aircraft. As shown, conduit 102 follows a largely vertical path with a slight bend towards the tail end of the aircraft. Air may enter from underneath the aircraft, flow through the conduit, and exit from the top of the aircraft. The air may flow in a direction opposite the direction of flight of the aircraft.

The hybrid cooling system may be utilized in an electric aircraft. An electric aircraft may require cooling of one or more batteries stored on the aircraft. Battery 104 as shown is positioned within conduit 102, allowing air to flow past the battery and cool it during flight. In some embodiments, a battery assembly comprising multiple batteries is placed within the conduit. Airflow through the conduit may dissipate heat and cause warmed air to be expelled from the aircraft. In some embodiments, airflow through the conduit is constant during forward flight. Cooling the battery during flight via airflow through the conduit may comprise a lightweight solution to continuously cool the battery. For example, cooling agents (e.g. a cooling liquid) or cooling equipment (e.g. a pump or engine) are not required to be stowed on the aircraft. In some embodiments, the conduit is constructed from a lightweight or thin material.

In some embodiments, active cooling equipment is built into the aircraft to cool the battery in addition to passive cooling that occurs due to the conduit. For example, active cooling may be provided during steady state flight by blowing forced air on the batteries. In various embodiments, a small engine or motor may be used. Active cooling equipment stowed onboard the aircraft during flight may serve as a safeguard in the event airflow through the conduit caused by typical flight of the aircraft does not sufficiently cool the battery.

In some embodiments, the conduit also acts as a vent path during flight. The conduit allows hazardous gases to be expelled from the aircraft. For example, batteries may produce combustible gases such as hydrogen or methane in the event of thermal runaway. The gases may leave the aircraft via conduit 102. In some embodiments, non-battery components requiring cooling or venting are placed in the airflow path in addition to or in lieu of a battery.

Figure 1B:
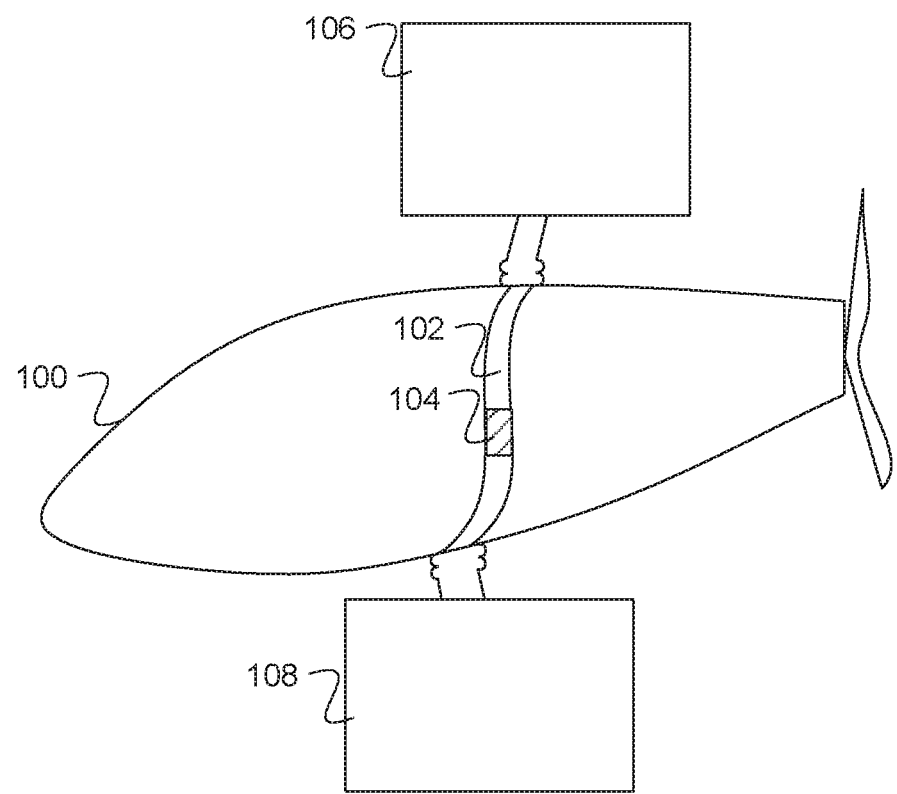
FIG. 1B is a diagram illustrating an embodiment of an aircraft hybrid cooling system.

FIG. 1B is a diagram illustrating an embodiment of an aircraft hybrid cooling system. In some embodiments, the hybrid cooling system is used to rapidly cool one or more batteries of an aircraft in the event the aircraft has completed a flight. For example, a cooling apparatus may be stored near an aircraft landing, storage, or maintenance area. Following landing, the aircraft may be brought to a service area where the one or more batteries are cooled using the cooling apparatus. The cooling apparatus may be hooked up to the aircraft or otherwise positioned about the aircraft to deliver a cooling medium through a conduit of a grounded aircraft. The cooling apparatus may comprise a container of cooling medium and a method of delivering the cooling medium. For example, a hose, a pump, a mister, an air conditioner, a suction, an inlet/outlet covering, or any appropriate equipment may be used. In some embodiments, the cooling apparatus comprises a component that collects or catches cooling medium that has passed through the conduit. In some embodiments, the design of the conduit allows for the batteries to be rapidly cooled using ad-hoc measures. For example, in lieu of cooling equipment, a user may use a household hose, watering can, water bottle, or any item to deliver liquid through the conduit and cool the batteries. Other components may be protected due to the configuration of the conduit and placement of batteries within the conduit.

In the example shown, aircraft 100 is grounded (e.g. not in flight). Conduit 102 traverses a fuselage of aircraft 100 and battery 104 is stored inside conduit 102. Container 106 is positioned at an outlet of conduit 102 atop the aircraft. Container 108 is positioned at an inlet of conduit 102 below the aircraft. Containers 106 and 108 as shown both comprise a hose that connects the respective containers to openings of the conduit. Various conduit opening coverings may be used. For example, a hose may comprise a rubber suction that creates a seal with a conduit opening. In some embodiments, a cooling medium is stored in one container, delivered through the conduit, and is caught in another container. For example, container 106 may be filled with a cooling liquid that pours through conduit 102, cooling battery 104, and is collected by container 108. In some embodiments, a cooling medium is pumped from container 108 up through conduit 102.

In some embodiments, multiple cooling agents may be applied through the conduit in a same direction or in opposing directions. For example, a cooling liquid may be dripped down from a higher opening of the conduit whereas an air conditioned gas that is lighter than air is pumped from a lower opening of the conduit. In some embodiments, the cooling apparatus is positioned to create a watertight or airtight seal to a conduit opening. In some embodiments, a cooling apparatus applies the cooling medium through the conduit without contact between the cooling apparatus and aircraft. In various embodiments, a single container or multiple containers are used. For example, in lieu of a container to catch used cooling medium, the aircraft may be positioned over a floor with built-in drains.

Figure 2:
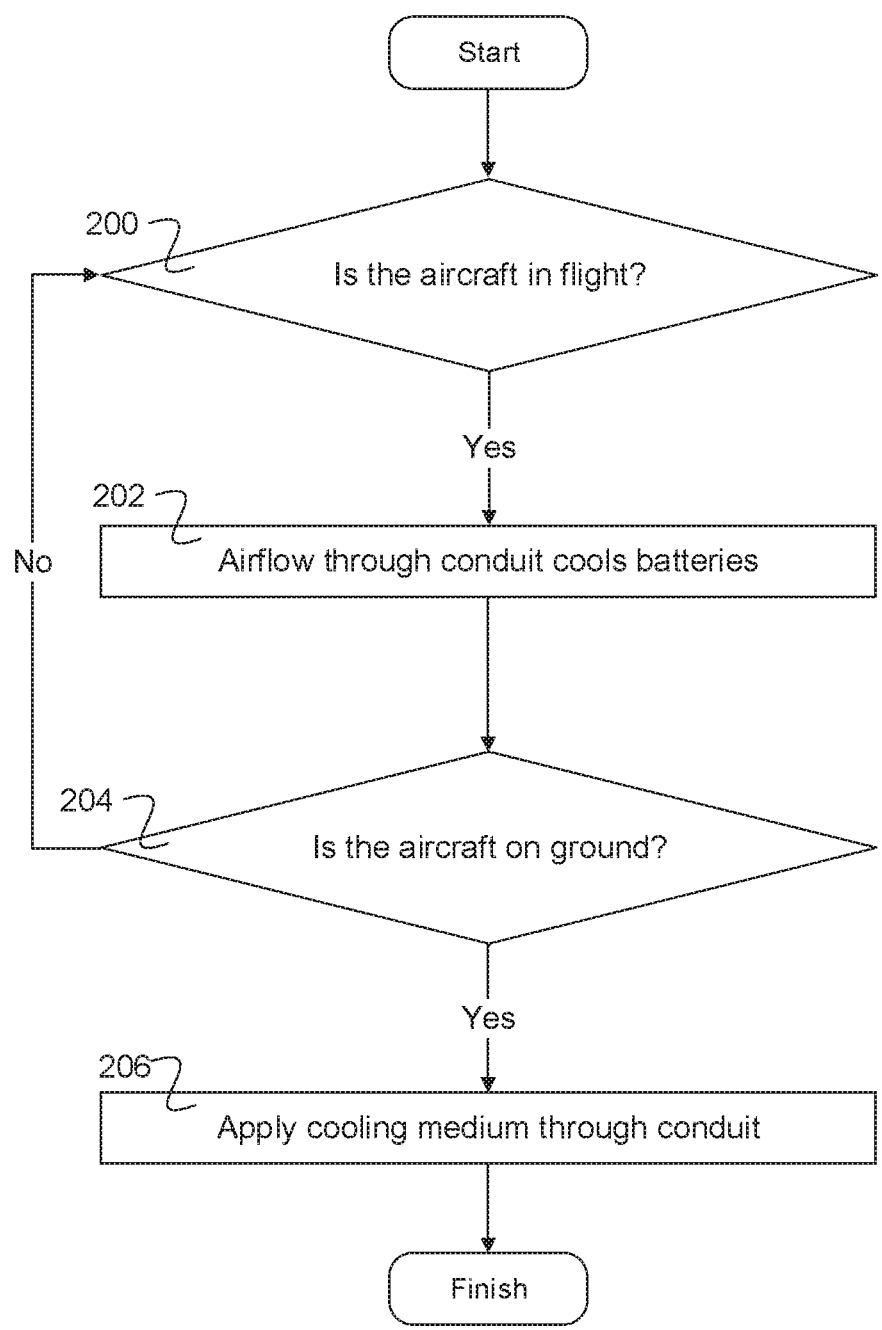
FIG. 2 is a diagram illustrating an embodiment of a process for cooling an aircraft using an aircraft hybrid cooling system.

FIG. 2 is a diagram illustrating an embodiment of a process for cooling an aircraft using an aircraft hybrid cooling system. At 200, it is determined whether the aircraft is in flight. In the event the aircraft is in flight, at 202 airflow through the conduit cools the batteries. In some embodiments, cooling of the batteries via airflow through the conduit occurs automatically due to the positioning and shape of the conduit and the positioning of the batteries inside the conduit. For example, one or more batteries may be held in place in the conduit via a battery assembly that has slots or gaps that allow airflow to reach individual batteries. In some embodiments, temperature measurements are determined by devices positioned in the conduit or on the batteries. In the event the batteries are not sufficiently cooled, active cooling onboard the aircraft may be engaged. For example, forced air may be blown over the batteries. In some embodiments, a warning is provided to the pilot. In some embodiments, the aircraft is automatically directed to a location with a cooling apparatus or otherwise directed to land quickly. For example, one temperature threshold may engage active cooling while in flight whereas a second higher temperature threshold may trigger automatic directing towards a designated landing area. Following 202 or in the event the aircraft is not in flight, at 204 it is determined whether the aircraft is on ground. In the event the aircraft is on ground, at 206 a cooling medium is applied through the conduit. In some embodiments, a cooling medium is not applied in the event temperature readings from a battery or from within the conduit indicate batteries are sufficiently cooled.

Figure 3A:
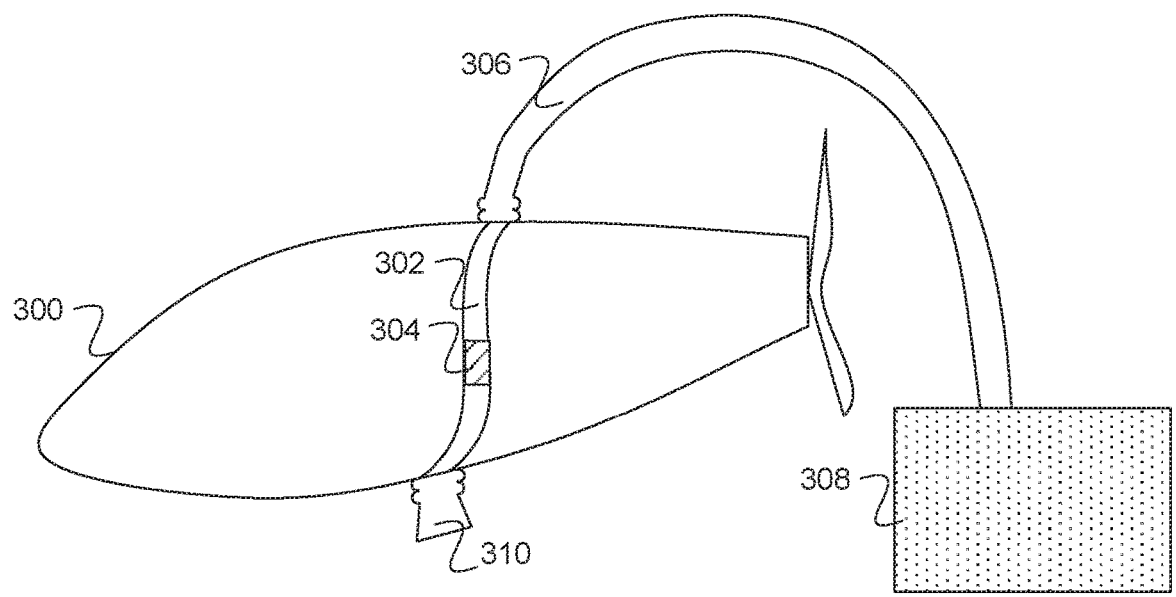
FIG. 3A is a diagram illustrating an embodiment of a sealed conduit that is positioned to be filled with a cooling medium.

FIG. 3A is a diagram illustrating an embodiment of a sealed conduit that is positioned to be filled with a cooling medium. In the example shown, aircraft 300 comprises conduit 304. Battery 302 is positioned within conduit 304. As shown, conduit 304 is sealed at a lower opening (e.g. an opening that is close to a bottom of the aircraft and also an inlet from which air enters the conduit in the event the aircraft is in flight). Stopper 310 is used to block the inlet of conduit 304 and prevent cooling medium from escaping from the conduit at the inlet. A cooling medium is stored in container 308. In some embodiments, the cooling medium comprises a cooling liquid. For example, water, oil, freon, oils, or any other appropriate liquid may be used. In some embodiments, a cooled or chilled liquid is used. Hose 306 as shown is connected to container 308. One end of hose 306 is positioned at the outlet (e.g. opening of the conduit that air flows out of during aircraft flight and opening that is positioned higher on the aircraft as compared to the inlet).

Figure 3B:
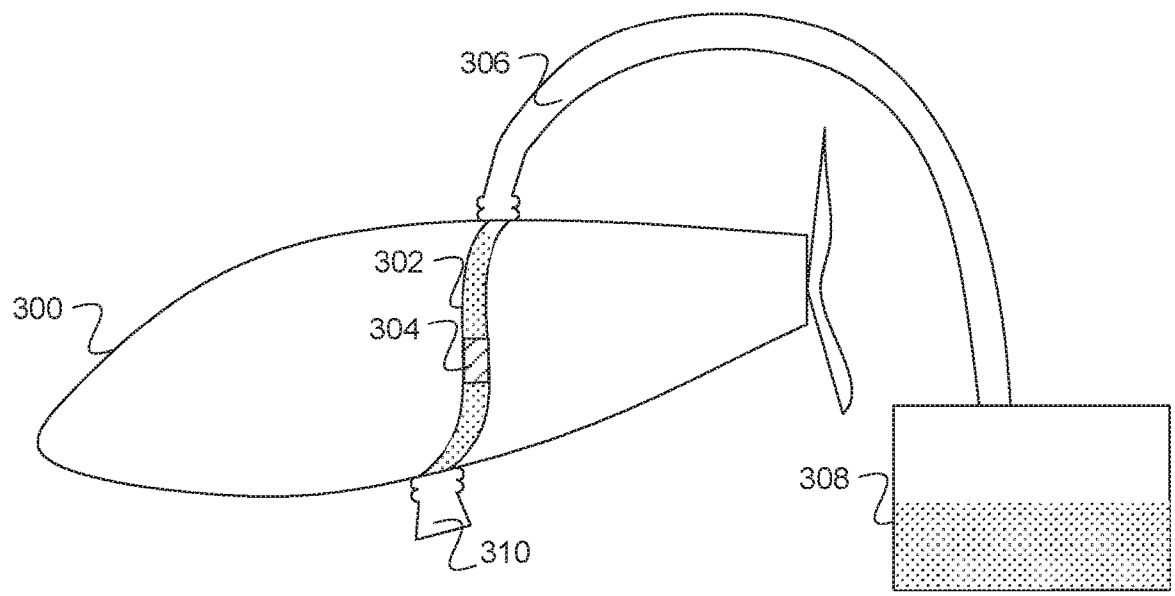
FIG. 3B is a diagram illustrating an embodiment of a sealed conduit in the process of being filled with a cooling medium.

FIG. 3B is a diagram illustrating an embodiment of a sealed conduit in the process of being filled with a cooling medium. In the example shown, container 308 has pumped cooling medium into conduit 302 of aircraft 300. Stopper 310 prevents cooling medium from leaking out of the conduit. Battery 304 as shown is submerged in cooling medium. In some embodiments, battery 304 comprises a battery assembly that allows gas and liquid to pass through the battery assembly and access one or more batteries stored in the battery assembly. In some embodiments, conduit 302 is watertight. Components of the aircraft that are not waterproof are not positioned in the conduit. In some embodiments, immersing the battery in cooling agent is a quick and efficient method of cooling the battery.

Figure 3C:
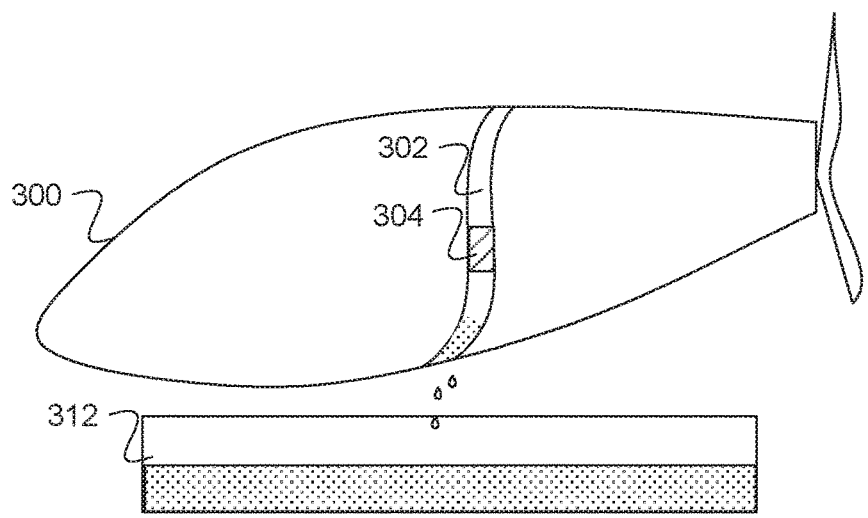
FIG. 3C is a diagram illustrating an embodiment of a conduit in the process of being drained of a cooling medium.

FIG. 3C is a diagram illustrating an embodiment of a conduit in the process of being drained of a cooling medium. In the example shown, the stopper is removed from the inlet of conduit 302, allowing the cooling medium to drain from the conduit out of its inlet/lower opening. As shown, container 312 catches cooling medium that drains from conduit 302.

Figure 3D:
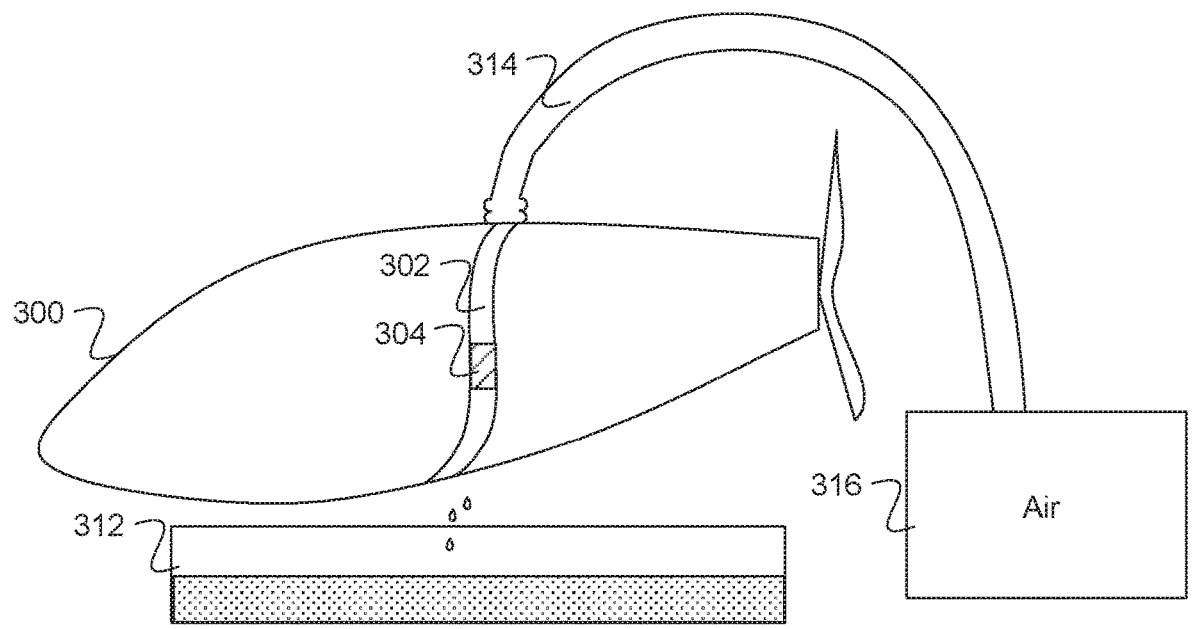
FIG. 3D is a diagram illustrating an embodiment of a conduit in the process of being blown dry.

FIG. 3D is a diagram illustrating an embodiment of a conduit in the process of being blown dry. In the example shown, container 316 holds air. Air is blown from container 316 through hose 314 and is blown through conduit 302. In some embodiments, air is blown through the conduit following application of a cooling medium in order to blow remnants of the cooling medium out of the conduit. Gases other than air may be used. As shown, cooling medium is caught below the aircraft from container 312. In some embodiments, air is not blown out of the conduit. For example, droplets of a cooling medium such as water may be left in the conduit to provide natural phase change cooling to the batteries during initial flight.

Figure 4:
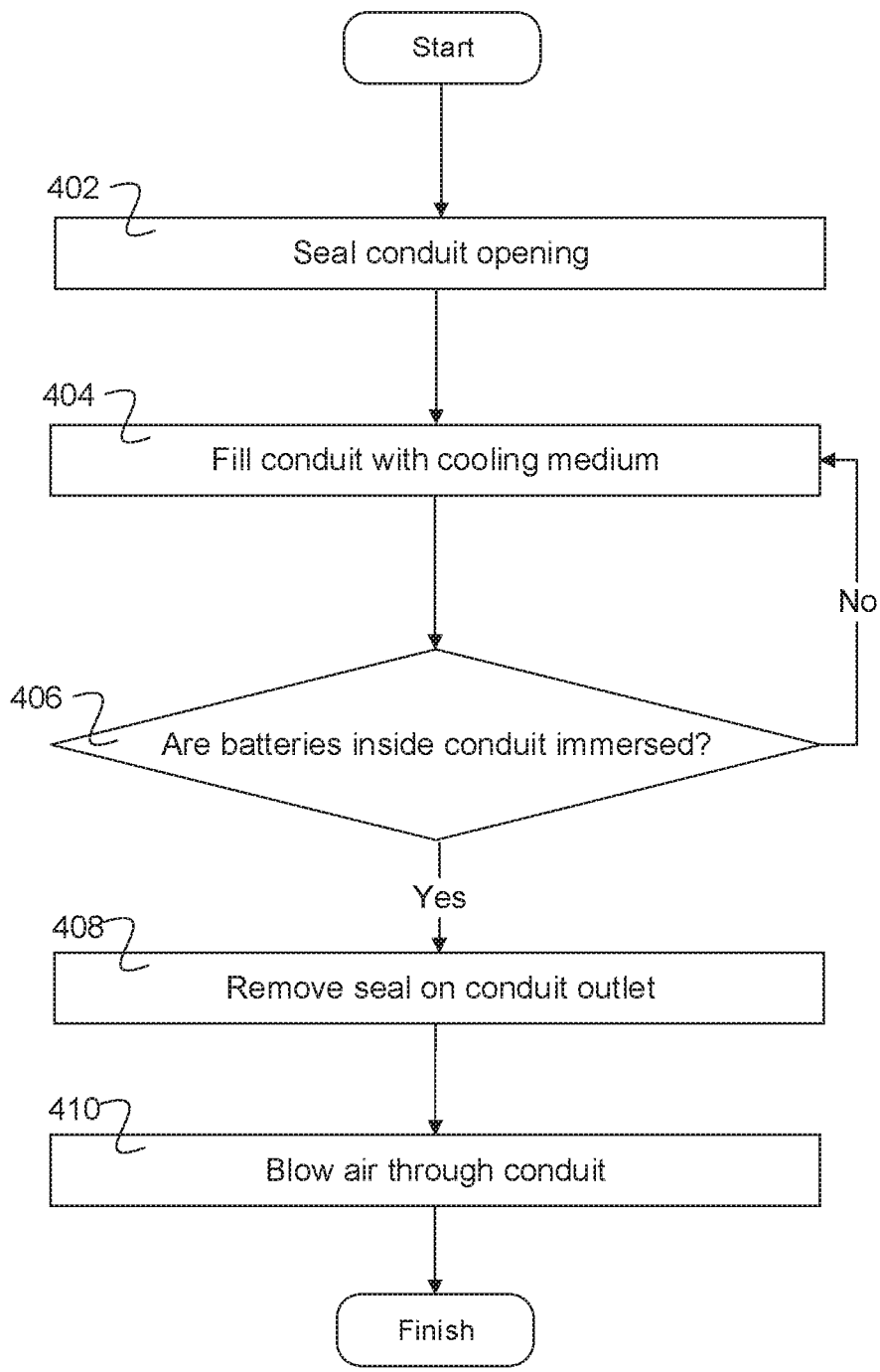
FIG. 4 is a flow diagram illustrating an embodiment of an aircraft hybrid cooling system process to cool an aircraft by filling a conduit of the aircraft with a cooling medium.

FIG. 4 is a flow diagram illustrating an embodiment of an aircraft hybrid cooling system process to cool an aircraft by filling a conduit of the aircraft with a cooling medium. In some embodiments, the conduit is waterproofed. For example, the conduit may be made with waterproof materials and prevent components of the aircraft not positioned in the conduit from coming into contact with a cooling liquid. In some embodiments, the conduit is made airtight in the event the cooling medium used is a cooling gas. In some embodiments, an aircraft comprising a non-waterproofed or non-airtight conduit may be rapidly cooled on land using other methods that do not require filling the conduit with a cooling medium. At 402, a conduit opening is sealed. An opening from which the cooling medium is to be applied may not be sealed whereas a remaining opening of the conduit is sealed. In various embodiments, an outlet or an inlet of the conduit is sealed. At 404, the conduit is filled with a cooling medium. At 406, it is determined whether batteries inside the conduit are immersed. In the event the batteries are not immersed, the conduit continues to be filled with the cooling medium. In the event the batteries are immersed, at 408 the seal on the conduit outlet is removed. In some embodiments, a temperature threshold and temperature measurement are used to determine when to continue filling with cooling medium. In some embodiments, a temperature threshold and temperature measurement are used to determine when to remove the seal on the conduit. For example, the cooling medium is kept inside the conduit until the temperature of the batteries reads low enough. At 410, air is blown through the conduit. For example, air is blown to blow dry the conduit. In some embodiments, a cleaning agent is used. For example, the conduit may be filled with a cooling agent that is detrimental to the conduit if left in the conduit (e.g. will cause the conduit to rust quickly). Water may be applied through the conduit to wash the conduit of the cooling agent.

Figure 5A:
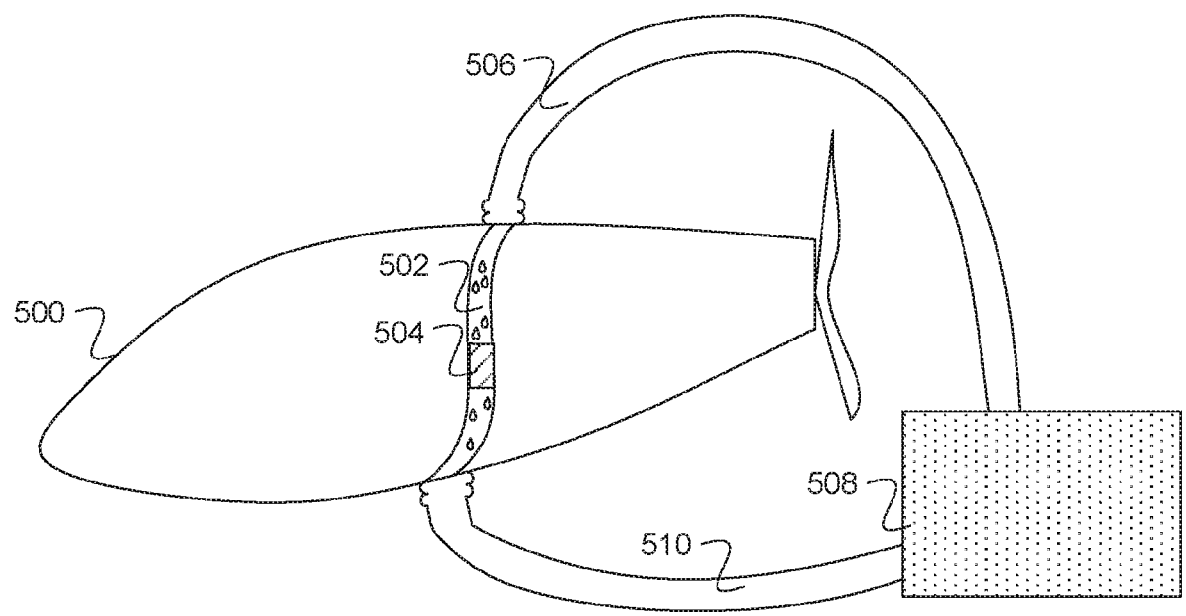
FIG. 5A is a diagram illustrating an embodiment of a conduit in the process of being dripped or sprayed with a cooling medium.

FIG. 5A is a diagram illustrating an embodiment of a conduit in the process of being dripped or sprayed with a cooling medium. In some embodiments, the aircraft is cooled via a continual convective heat transfer process. In the example shown, a cooling medium stored in container 508 travels through hose 506 and is dripped or sprayed through an outlet of conduit 502 of aircraft 500. The cooling medium drips over battery 504, cooling battery 504. In some embodiments, battery 504 comprises a battery assembly that allows gas and liquid to pass through the battery assembly and access one or more batteries stored in the battery assembly. A cooling liquid may be applied at a low speed or pressure. In some embodiments, the conduit is not required to be watertight or waterproof using a low speed or pressure application in comparison to a full immersion application. For example, the conduit may be made of a water-resistant material or may have leaks. In some embodiments, the shape and configuration of the conduit enables a cooling liquid to flow through the aircraft in a roughly vertical direction. For example, a cooling liquid applied is unlikely to seep through gaps in the conduit and rather will travel down and through the conduit due to gravity.

In some embodiments, a cooling medium is continuously pumped through the aircraft. The cooling medium may be captured from where it exits the conduit. In some embodiments, collected cooling medium is treated (e.g. recycled through a heat exchanger) and pumped back into the conduit. For example, the coolant may be re-cooled before being returned to the conduit. In the example shown, hose 510 is positioned at the inlet of conduit 502. Cooling medium is captured via hose 510 and returned to container 508. In some embodiments, new coolant is continuously added to the conduit.

In the example shown, hose 506 and hose 510 are positioned flush against aircraft 500. In some embodiments, the hoses form an airtight or watertight seal to the openings of the conduits. A cooling apparatus may form a seal to one or more openings of the conduit using various coverings.

Figure 5B:
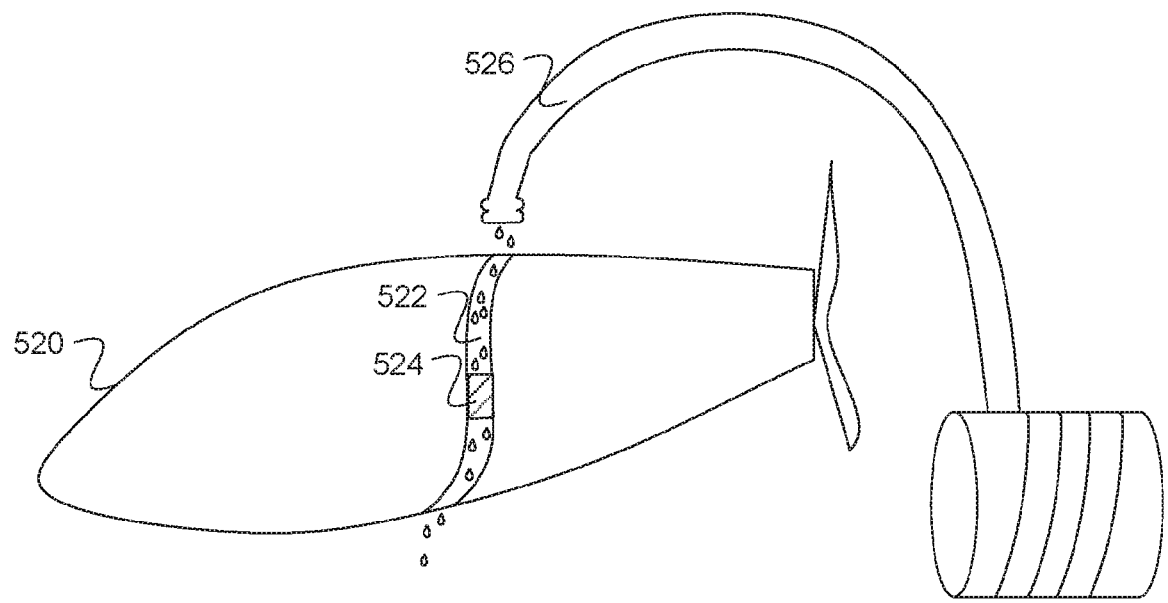
FIG. 5B is a diagram illustrating an embodiment of a conduit in the process of being dripped or sprayed with a cooling medium.

FIG. 5B is a diagram illustrating an embodiment of a conduit in the process of being dripped or sprayed with a cooling medium. In the example shown, the cooling apparatus of hose 526 does not come in contact with aircraft 520. Hose 526 is used to drip or spray a cooling medium through conduit 522 and cool battery 524. In some embodiments, the cooling medium is sprinkled through the conduit. The cooling medium may be housed in containers of various styles or shapes. In the example shown, used cooling medium is not collected at the inlet of the conduit.

Figure 6:
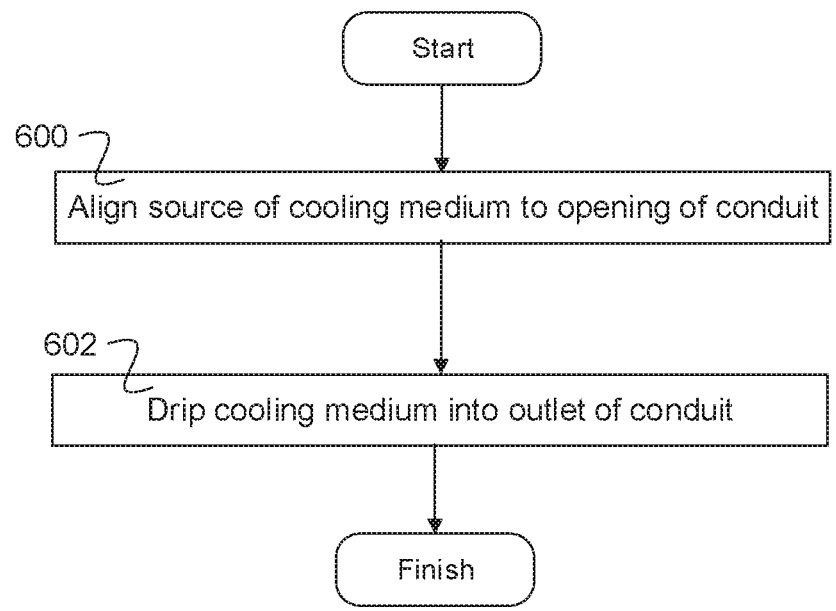
FIG. 6 is a flow diagram illustrating an embodiment of an aircraft hybrid cooling system process to cool an aircraft by dripping or spraying a cooling medium through a conduit.

FIG. 6 is a flow diagram illustrating an embodiment of an aircraft hybrid cooling system process to cool an aircraft by dripping or spraying a cooling medium through a conduit. At 600, a source of a cooling medium is aligned to an opening of the conduit. In some embodiments, the source of the cooling medium is in direct contact with the opening of the conduit. At 602, a cooling medium is dripped into the outlet of the conduit. In some embodiments, the cooling medium is sprayed. For example, a cooling liquid is applied at a low pressure. In some embodiments, applying a cooling liquid at a low pressure rather than immersing a battery in the conduit with a cooling liquid accommodates conduits that are not waterproof. In some embodiments, air is blown through the conduit after the cooling medium is applied in order to dry the conduit.

Figure 7A:
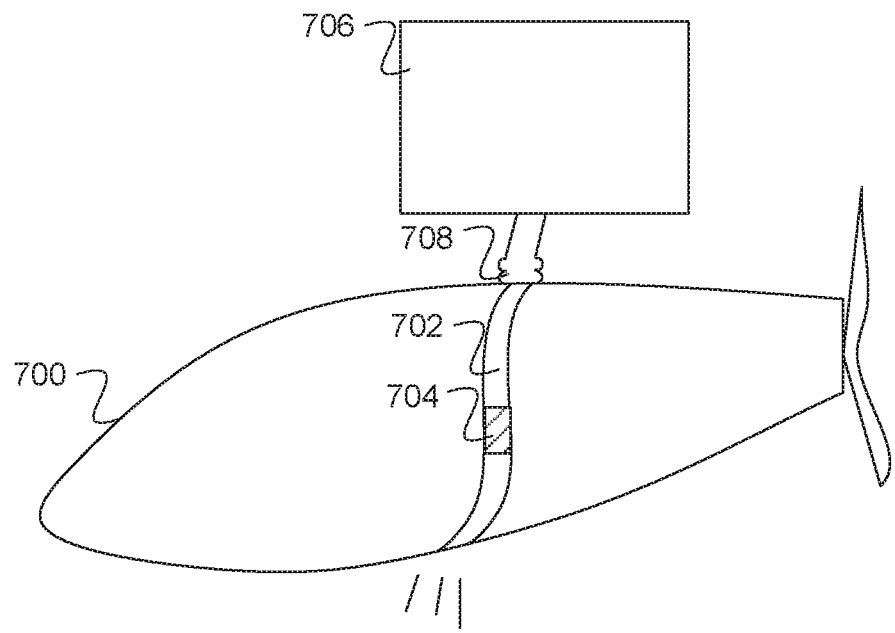
FIG. 7A is a diagram illustrating an embodiment of a conduit receiving a stream of cooling gas.

FIG. 7A is a diagram illustrating an embodiment of a conduit receiving a stream of cooling gas. In the example shown, container 706 comprises a cooling gas, such as air-conditioned gas. A cooling gas is applied to conduit 702 of aircraft 700 through hose 708, which is connected to container 706 as shown. As shown, hose 708 is attached at the outlet of conduit 702 (e.g. a first opening of two openings of the conduit, wherein the first opening is positioned higher on the aircraft than a second opening of the two openings). The cooling gas passes through battery 704, which may comprise a battery assembly comprising slots or gaps. In some embodiments, the cooling gas cools battery 704 and exits an opening of the conduit opposite an opening at which the cooling gas is applied.

Figure 7B:
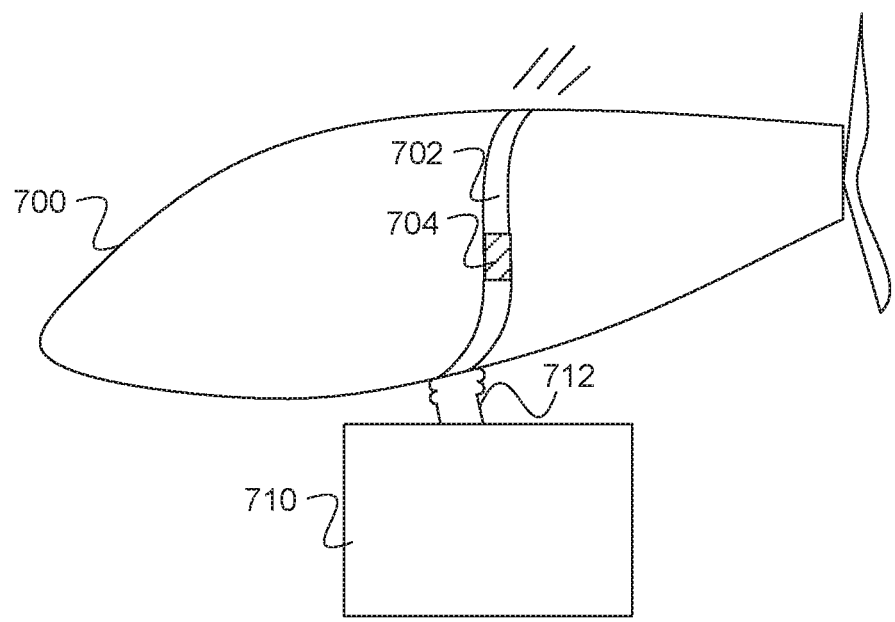
FIG. 7B is a diagram illustrating an embodiment of a conduit receiving a stream of cooling gas.

FIG. 7B is a diagram illustrating an embodiment of a conduit receiving a stream of cooling gas. In various embodiments, gas may be applied at the inlet or outlet of the aircraft. In the example shown, gas is applied at the inlet of aircraft 700 via hose 712 and container 710. The gas may cool battery 704, which is positioned in conduit 702. In some embodiments, a high conductivity gas spray is used. For example, hydrogen and helium have higher thermal conductivities than air and may be used to efficiently carry heat away from the battery. A combination of different gases may be used.

Figure 8:
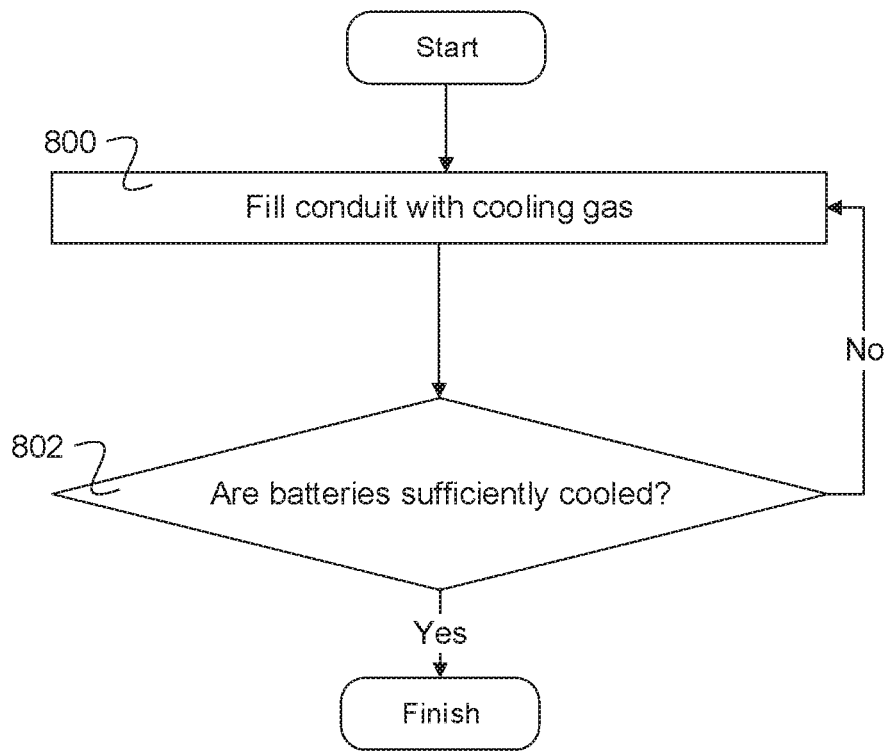
FIG. 8 is a flow diagram illustrating an embodiment of an aircraft hybrid cooling system process to cool an aircraft by applying a cooling gas to a conduit.

FIG. 8 is a flow diagram illustrating an embodiment of an aircraft hybrid cooling system process to cool an aircraft by applying a cooling gas to a conduit. At 800, the conduit is filled with cooling gas. At 802, it is determined whether the batteries are sufficiently cooled. In the event the batteries are not sufficiently cooled, the conduit continues being filled with cooling gas. In the event the batteries are sufficiently cooled, the process is finished. In the event cooling gases that are not desired to be exposed to the rest of the aircraft are used, the conduit may be required to be airtight. In some embodiments, the cooling gas is applied at either the inlet or outlet of the conduit based on the cooling gas's density (e.g. whether it will rise or sink). In some embodiments, the cooling gas is treated to be at a cool temperature. The cooling gas may be forced through the conduit at a high speed. For example, the conduit may be blasted with air-conditioned air. In some embodiments, the conduit is sealed at one opening and the conduit is filled with a cooling gas until the battery is immersed.

Figure 9:
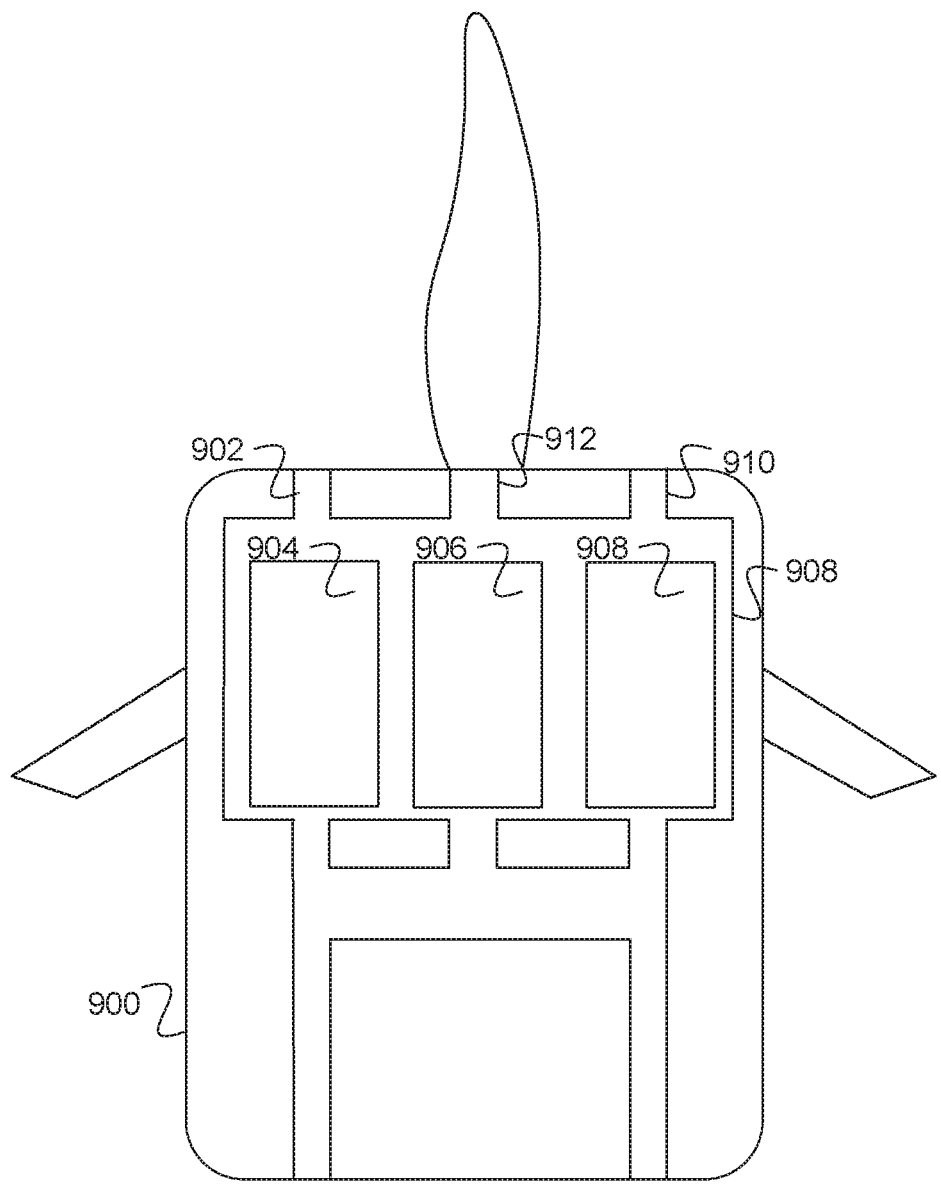
FIG. 9 is a diagram illustrating an embodiment of a front view of an aircraft comprising an aircraft hybrid cooling system.

FIG. 9 is a diagram illustrating an embodiment of a front view of an aircraft comprising an aircraft hybrid cooling system. Aircraft 900 is shown from a head-on view (e.g. facing the cockpit). In the example shown, center chamber 908 comprises batteries 904, 906, and 908. Batteries 904, 906, and 908 may comprise battery packs. Air may enter two inlets at the bottom of the aircraft during flight. The two inlets are connected by a channel. The three airflow paths are connected to the channel and allow air to flow through the channel to center chamber 908. In some embodiments, air flows out of center chamber 908 through conduits 902, 912, and 910 during flight. Air passes through center chamber 908 as part of all the conduits. As air flows through the conduits during flight, the batteries are cooled. Gases produced by the batteries may be expelled via conduits 902, 912 and 910. In the example shown, conduits 902 and 910 extend from inlet to outlet whereas conduit 912 extends halfway through the aircraft. Some air that enters conduits 902 and 910 flows through conduit 912. In some embodiments, a conduit comprises forks. In various embodiments, one, two, four, or any appropriate number of conduits may be used in an aircraft. In some embodiments, a cooling agent is applied through conduits of various configurations and numbers to cool the batteries in the event the aircraft is on ground.

Figure 10A:
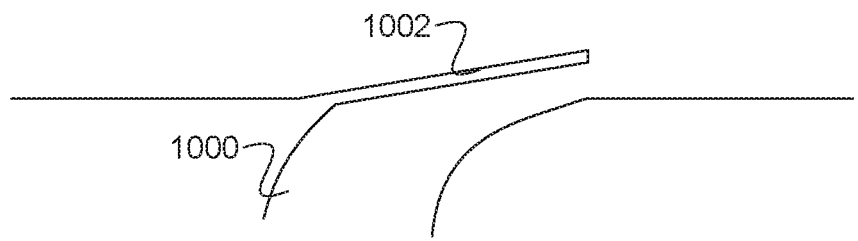
FIG. 10A is a diagram illustrating an embodiment of a conduit outlet.

FIG. 10A is a diagram illustrating an embodiment of a conduit outlet. The conduit outlet may comprise the end of the conduit that air is expelled from in the event the aircraft is in flight. In some embodiments, the outlet has a cover that prevents rain, debris, or any undesired matter from entering the outlet. The cover may be needed in the event the outlet is positioned at the top of the aircraft. In the example shown, flap 1002 covers the outlet of conduit 1000. In some embodiments, flap 1002 is installed in a fixed position. The flap may protect the conduit while allowing air to escape. In some embodiments, flap 1002 has multiple possible positions. For example, the flap may be manipulated to allow more or less air out. The flap may be opened or removed to allow a cooling medium to applied at the outlet.

Figure 10B:
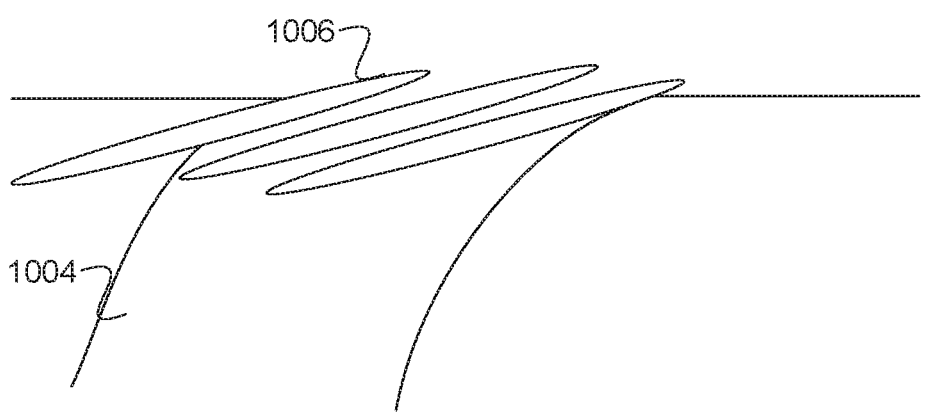
FIG. 10B is a diagram illustrating an embodiment of a conduit outlet.

FIG. 10B is a diagram illustrating an embodiment of a louvered conduit outlet. Various covers or covering apparatuses may be used at the outlet of the conduit. In the example shown, slats 1006 are installed at the outlet of conduit 1004. The slats may allow air to escape from the aircraft while preventing undesired objects from entering the airflow path. The slats may be maneuvered to an open or vertical position to allow a cooling medium to be applied at the outlet.

Figure 11A:
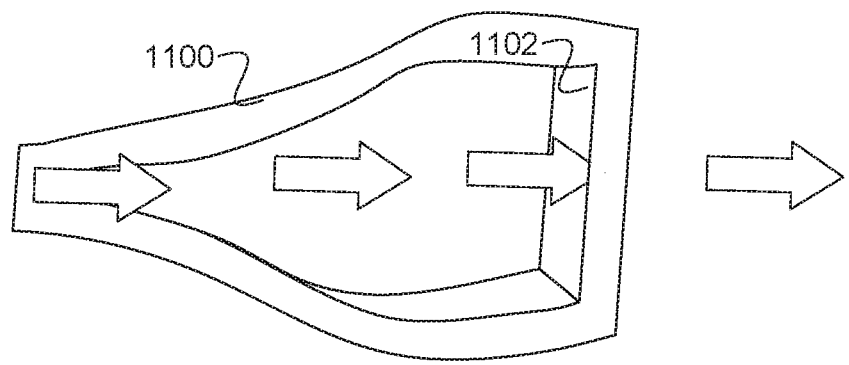
FIG. 11A is a diagram illustrating an embodiment of a louvered conduit inlet.

FIG. 11A is a diagram illustrating an embodiment of a conduit inlet. The inlet may comprise the end of the conduit that air enters from during flight. In some embodiments, a National Advisory Committee for Aeronautics (NACA) inlet is utilized. The inlet may comprise a depression that is shallow and gradually deepens into an opening. In the example shown, air enters from a tapered end of the inlet and enters opening 1102 of the inlet. The inlet may comprise a shallow depression at its tapered end that deepens, reaching its deepest point at opening 1102. Opening 1102 may attach to a conduit. The inlet may be shaped to effectively funnel air into the airflow path.

Figure 11B:
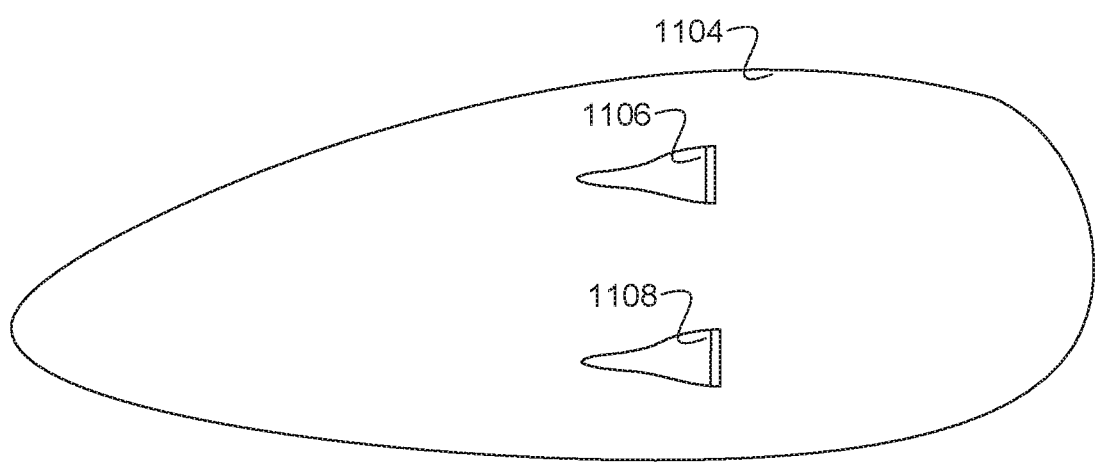
FIG. 11B is a diagram illustrating an embodiment of a conduit inlet.

FIG. 11B is a diagram illustrating an embodiment of a conduit inlet. Aircraft 1104 is shown from below. The underside of aircraft 1104 comprises inlets 1106 and 1108. The narrow end of the inlets as shown are positioned closer to the nose of the aircraft.

Figure 12:
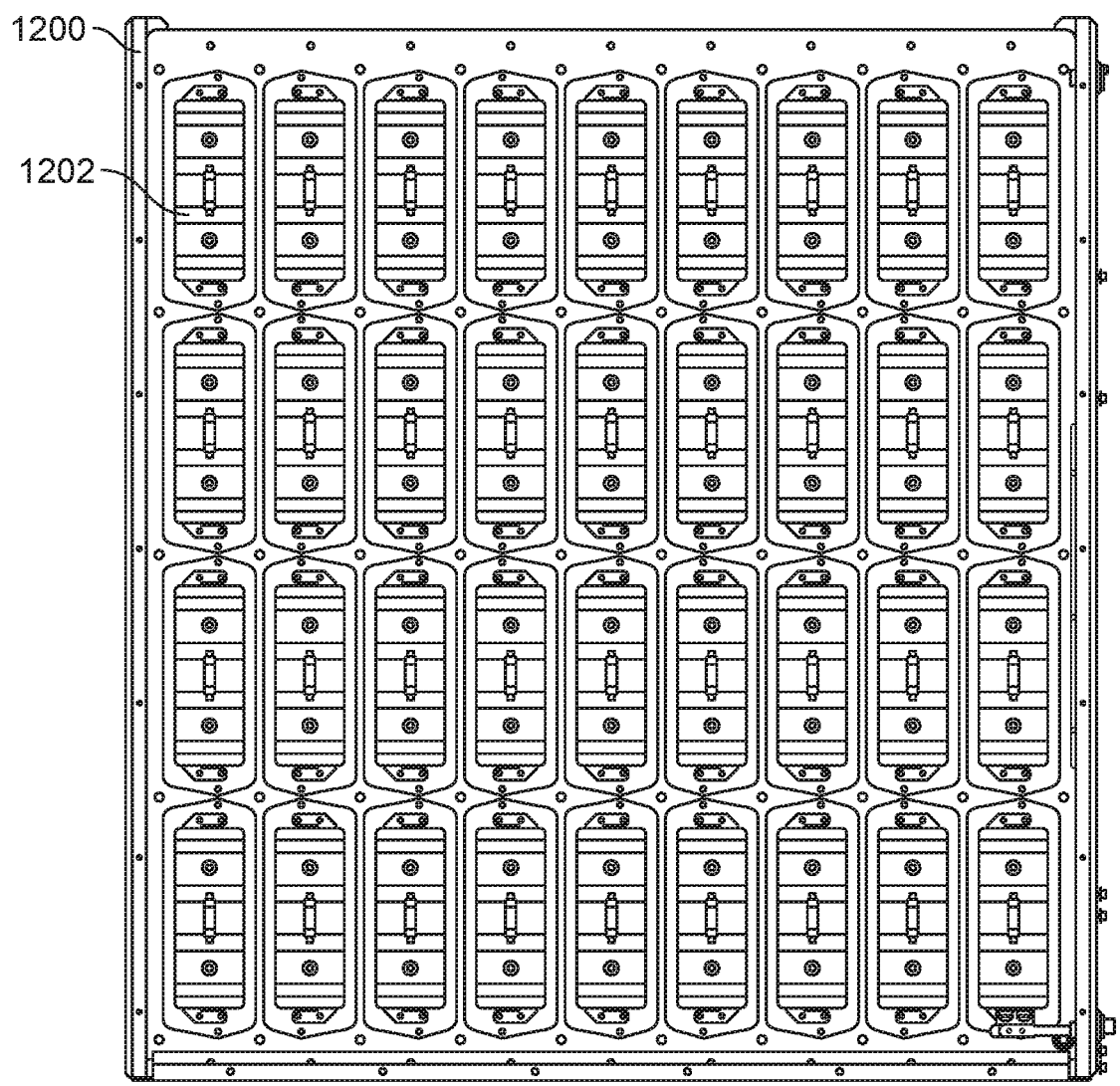
FIG. 12 is a diagram illustrating an embodiment of a battery pack.

FIG. 12 is a diagram illustrating an embodiment of a battery pack. In some embodiments, the battery pack comprises battery 104 of FIG. 1B. In the example shown, a multitude of batteries are stored in pack structure 1200. Pack structure 1200 may comprise a frame made to hold batteries. Pack structure 1200 may comprise fiberglass, aluminum, or any appropriate materials. As shown, battery 1202 is stored in the pack structure along with 35 other batteries.

Figure 13:
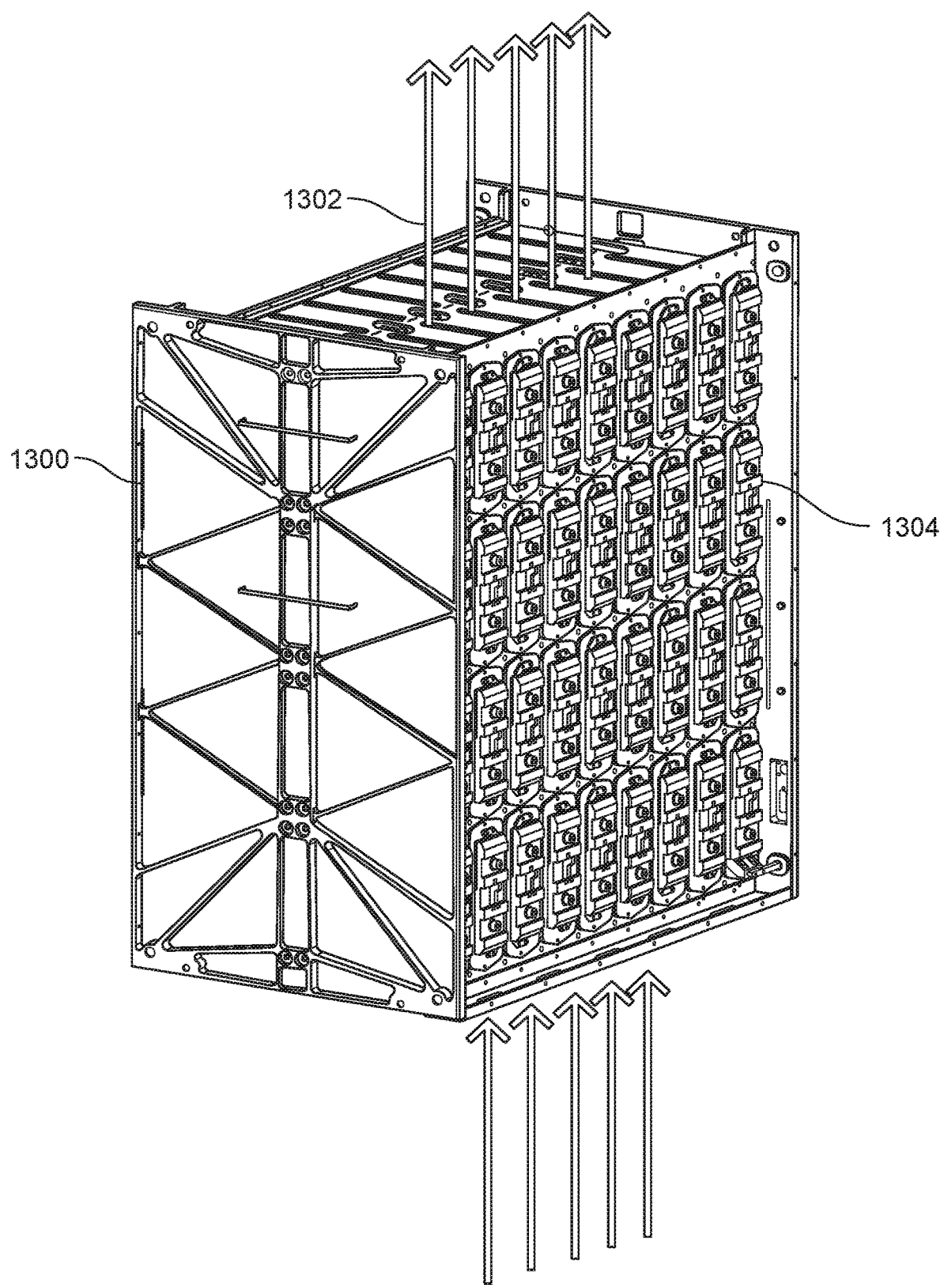
FIG. 13 is a diagram illustrating an embodiment of airflow through a battery pack.

FIG. 13 is a diagram illustrating an embodiment of airflow through a battery pack. In some embodiments, multiple batteries are stored in a pack structure that comprises openings in it that allow air and cooling medium to flow through the pack structure. In the example shown, pack structure 1300 comprises slit 1302 and a plurality of other slits. The slits may run through the entirety of the pack structure. The slits as shown are positioned in between the columns of batteries. The slits may enable each individual battery stored in the pack structure to be exposed to airflow and cooling medium. As shown, battery 1304 and 35 other batteries are stored in the front of pack structure 1300. An additional 36 batteries may be stored in the back side of the pack structure. As shown, two rows of slits are present in the pack structure, allowing air to flow over the batteries stored in the front of the pack structure and batteries stored in the back of the pack structure. In various embodiments, 20, 72, 100, or any appropriate number of batteries may be stored in a single pack structure.

The pack structure may be attached to an inner wall of an airflow path. The pack structure may be installed such that air or cooling medium flows through the openings of the pack structure.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. An aircraft hybrid cooling system, comprising:
    a conduit through an aircraft fuselage of an aircraft, configured to allow airflow through the conduit, the conduit including a first end positioned at or adjacent to an underside of the aircraft fuselage and a second end positioned at or adjacent to a top side of the aircraft fuselage; and
    a battery assembly positioned in the conduit, configured to provide for airflow past a battery in the battery assembly in a first mode of operation in which airflow enters the conduit at the first end and exits at the second end and configured to provide flow of a cooling medium past the battery in a second mode of operation in which the cooling medium enters the conduit at the second end, flows through the conduit at least in part due to the force of gravity, and exists at the first end;
    wherein an opening at the second end of the conduit is aligned with and configured to receive a quantity of the cooling medium from a source of the cooling medium in the second mode of operation, and
    wherein, during at least a first phase of the second mode of operation, the system further comprises a stopper positioned to prevent the cooling medium from exiting the conduit at the first end.

2. The system of claim 1, wherein the aircraft is in flight in the first mode of operation.

3. The system of claim 1, wherein the aircraft is on land in the second mode of operation.

4. The system of claim 1, wherein the conduit is configured to enable airflow through the conduit to cool the battery in the battery assembly during forward flight.

5. The system of claim 1, wherein the cooling medium comprises water.

6. The system of claim 1, wherein the cooling medium comprises oil.

7. The system of claim 1, wherein the cooling medium comprises a chilled liquid.

8. The system of claim 1, wherein the conduit comprises a continuous, unobstructed upward slope from the battery to an outlet positioned at an end of the conduit.

9. The system of claim 1, wherein the battery assembly includes structures that allow gas and liquid to pass through the battery assembly and access one or more batteries stored in the battery assembly.

10. The system of claim 1, wherein the quantity of the cooling medium is sufficient relative to a volume of the conduit and a position of the battery assembly within the conduit to immerse the battery assembly in the cooling medium.

11. A method to cool a battery assembly using an aircraft hybrid cooling system comprising a conduit through an aircraft fuselage, configured to allow airflow through the conduit, the conduit including a first end positioned at or adjacent to an underside of the aircraft fuselage and a second end positioned at or adjacent to a top side of the aircraft fuselage, and a battery assembly positioned in the conduit, configured to provide for airflow past a battery in the battery assembly in a first mode of operation in which airflow enters the conduit at the first end and exits at the second end and configured to provide flow of a cooling medium past the battery in a second mode of operation, the method comprising:
    positioning a stopper to prevent the cooling medium from exiting the conduit at the first end;
    aligning a source of the cooling medium with an opening at the second end of the conduit; and
    supplying a quantity of the cooling medium into the conduit via the opening at the second end of the conduit.

12. The method of claim 11, wherein the cooling medium comprises water.

13. The method of claim 11, wherein the cooling medium comprises oil.

14. The method of claim 11, wherein the cooling medium comprises a chilled liquid.

15. The method of claim 11, further comprising determining the battery assembly has been cooled sufficiently.

16. The method of claim 15, further comprising removing the stopper.

17. The method of claim 16, wherein removal of the stopper allows the quantity of the cooling medium to flow out of the conduit via the first end.

18. The method of claim 11, wherein the conduit comprises a continuous, unobstructed upward slope from the battery to an outlet positioned at an end of the conduit.

19. The method of claim 11, wherein the battery assembly includes structures that allow gas and liquid to pass through the battery assembly and access one or more batteries stored in the battery assembly.

20. The method of claim 11, wherein the quantity of the cooling medium is sufficient relative to a volume of the conduit and a position of the battery assembly within the conduit to immerse the battery assembly in the cooling medium.

* * * * *